July 26, 1960

O. JUNKER 2,946,834

METHOD AND APPARATUS FOR ELECTRIC
INDUCTION FURNACE MELTING

Filed Nov. 25, 1955

INVENTOR:
OTTO JUNKER,

BY Freeman & Harwood,

HIS AGENTS.

July 26, 1960

O. JUNKER 2,946,834

METHOD AND APPARATUS FOR ELECTRIC
INDUCTION FURNACE MELTING

Filed Nov. 25, 1955

INVENTOR:
Otto Junker,
By [signature]
His Attorney.

United States Patent Office 2,946,834
Patented July 26, 1960

2,946,834
METHOD AND APPARATUS FOR ELECTRIC INDUCTION FURNACE MELTING

Otto Junker, Lammersdorf, Germany, assignor, by mesne assignments, to Otto Junker (Offene Handelsgesellschaft), Lamersdorf, Germany, a partnership of Germany Filed Nov. 25, 1955, Ser. No. 549,143

6 Claims. (Cl. 13—27)

The invention relates to the art of melting, and relates more specifically to a method for melting in an electric induction furnace solid metal parts, particularly those metal parts having a large surface, such as chips or foil.

The invention has among its objects to increase the melting speed for solid particles in induction furnaces and to provide at the increased melting speed for a continuous charging of the furnace from above with solid metal pieces and withdrawing the molten metal in liquid form from the bottom of the furnace.

Induction furnaces are provided with a primary induction coil that surrounds the crucible, and the metal is molten by the energy induced by the primary coil, which energy is transformed into heat.

In many instances, the turbulent movements induced in the metal bath by the electric induction has been considered to be detrimental, and the prior art proposed various means to dampen the forces that induce the turbulence.

The instant invention, however, has among its aims to promote and to increase the movement of the metal bath. An increased movement of the metal bath, as I have found, has the advantage that the speed of melting of small pieces with a large surface, such as chips or foils, is increased at an unexpected high rate, accompanied by a considerable reduction in waste, as the movement of the bath causes a continuous downward flow of the small pieces from the portion near the level toward the pre-molten sump in the lower part of the bath.

With the above and other objects of the invention in view, the invention consists in the novel methods and apparatus, one embodiment being illustrated in the accompanying drawings and described in the specification.

The foregoing and other objects of the invention will be best understood from the following description of an exemplification thereof, reference being had to the accompanying drawings, wherein.

Figure 1:
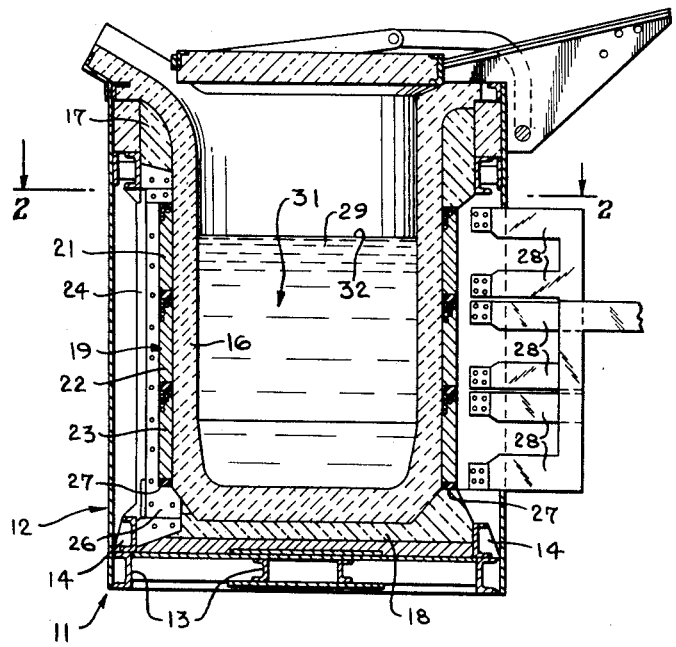
Fig. 1 is a longitudinal vertical sectional view of a furnace embodying the invention.
Figure 2:
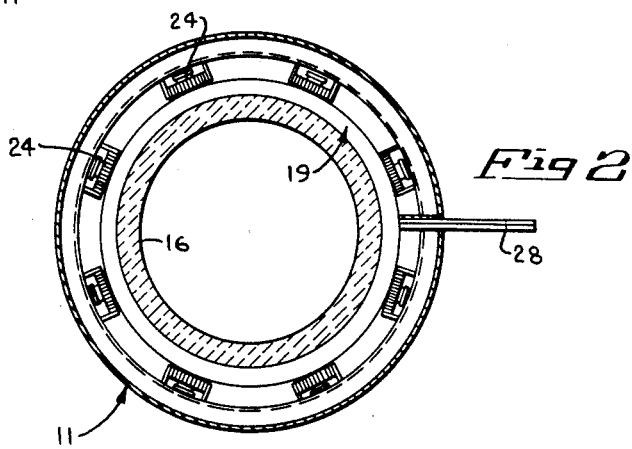
Fig. 2 is a horizontal sectional view taken on line 2—2 of Fig. 1.

A furnace, generally indicated at 11, comprises a frame 12 that is formed of angle irons 13, and sheet metal parts 14. In the frame 12 there is supported a crucible 16 which is composed of refractory material, such as, for instance, a ramming mixture. The crucible 16 is embedded in a heat insulation which includes upper and lower portions 17 and 18.

A cylindrical primary coil 19 encircles the external surface of the crucible 16, and is subdivided into a plurality of sections, such as, for instance, three sections including a top section 21, a middle section 22, and a bottom section 23. All the sections are aligned within an elongated annular chamber that is defined between the external surface of the crucible 16, and the internal surfaces of a series of magnetic armature sections 24 that are uniformly spaced from each other along the periphery of a circle about the axis of the crucible 16. Each armature section 24 includes sheet metal laminations, and lower lugs 26 that project radially inwardly and serve to support an annular insulation 27 which in turn supports the coil 19. The armature sections 24 are connected to the frame 12.

Bus bars 28 are provided to feed electric current to the sections 21, 22 and 23 of the coil 19, and the bus bars 28 are interconnectable to a source (not shown) of supply of the electric current.

Three switches 33, 34 and 36 are shown cooperating with the bus bars 28, and are interconnected to three regulatable transformer sections 37a, 37b and 37c, respectively, of a regulating transformer 37. The switch 33 is assigned to the coil top section 21, the switch 34 to the coil middle section 22, and the switch 36 to the coil bottom section 23. All of the coil sections 21, 22 and 23 are connected to one lead 42 of the regulating transformer 37, while each of the switches 33, 34 and 36 is connected to a regulatable transformer section 37a, 37b and 37c, respectively, of the regulating transformer 37.

Each regulatable transformer section has a regulating contact 43 and a series of contact points 44-1 to 44-5 for the stepped adjustment of the current supplied to the respective switch, including a null-position 44-6 to avoid the inducing of a capacity in the respective coil section when the switch thereof is open. Thus, when all the switches are closed, and the contacts 43 are positioned in contact with the points 44-1 of maximum current transfer, the entire coil 19 will be energized; when the switch 36 is closed, and the other switches are open and the contacts 43 are at 44-6, only the coil bottom section 23 will be energized and the other coil sections be de-energized; likewise, when the switch 34 is closed, and the other switches are open, only the coil middle section 22 will be energized and the other coil sections be de-energized; lastly, when the switch 33 is closed and the other switches are open, only the coil top section 21 will be energized and the other coil sections be de-energized.

With the aid of the sections of the regulating transformer 37, the energy delivered to the coil sections can be adjusted.

The metal bath inside the crucible is designated 31, and has a level 32, and the region of the bath 31 near the level 32 is designated 29.

It is, as explained previously, among the aims of the invention to move the region 29 strongly during the melting process. In accordance with the invention this may be induced in the region 29 by locating the upper end of the top coil section 21 adjacent or above the region 29 and feeding the coil 19 with a current of low line frequency. Alternatively, this may also be accomplished by increasing the height of the coil 19 relative to the coil diameter, or by increasing the density of the electric power in the region 29. The same effect may also be attained by reducing the horizontal distance between the coil 19 and the melting bath 31, or by employing an electrically conducting crucible with a wall as thin as possible.

While the coil 19 has been described as preferably composed of several sections, the coil may instead be made of one piece. The one piece coil may be subdivided electrically.

In accordance with a preferred method, the largest amount of electrical energy is induced in the coil at a portion thereof near the level 32 of the bath 31, for instance, in the top section 21 of the coil 19. Thereafter, the portion of the heating coil provided in the lower region of the melting bath, for instance, the coil sections 22 and 23, may either be switched off during the melting process, or may be supplied with a smaller electric power sufficient to maintain the molten metal hot.

Another preferred method in accordance with the invention is to provide for a pre-melting step to induce in the lower region of the bath 31 a pre-molten metal sump with rising bath level, and thereafter to charge stepwise the top portion of the coil, such as the top section 21, with the main part of electric power, while the lower portion, such as the coil sections 22 and 23, is either switched off or is furnished only with a power sufficient to keep the metal hot.

The energization of the coil sections can be carried out by closing the respective switch of the coil section. For stepwise upward energization, the operator will first close the switch 36, thereafter close the switch 34 and open the switch 36, and subsequently close the switch 33 and open the switch 34. Instead of turning off the lower switches 36 and 34, the operator may reduce the energy imparted by a suitable adjustment of the contacts 43 of the respective sections of the regulating transformer 37.

The process may also be accomplished, either alone or in combination with one or more of the previous methods, by using a crucible 16 that has an efficient height which is greater than its diameter.

The process may be carried out by continuously or intermittently charging the crucible 16 from above with solid metal pieces, and to withdraw molten metal from the crucible intermittently.

Figure 3:
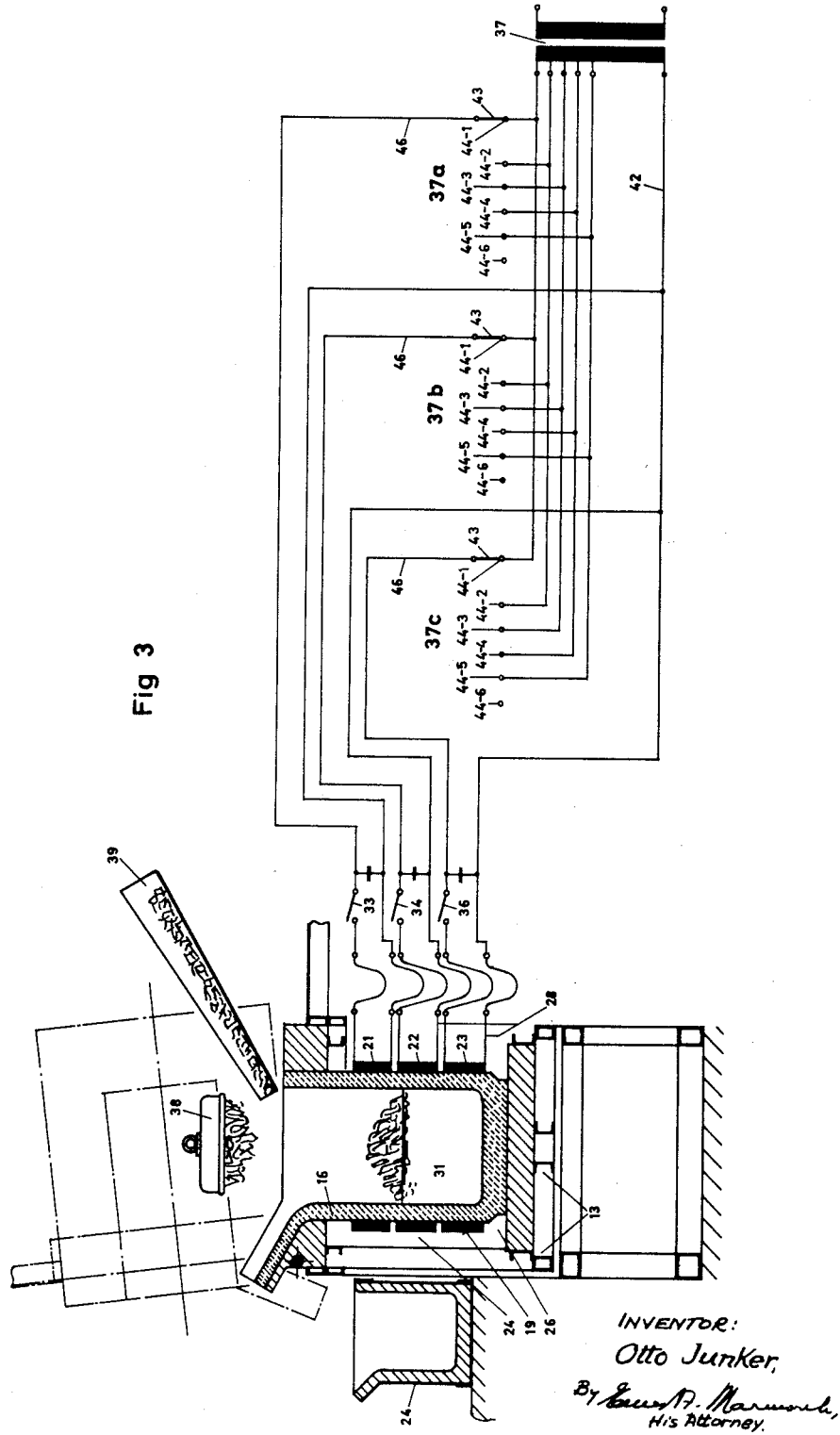
Fig. 3 is a vertical sectional view similar to Fig. 1, but including switching and charging arrangements and showing the crucible in two different positions.

Two possibilities are shown in Fig. 3 for charging, namely either by means of a chute 39 for continuous charging or by a magnet 38 for intermittent charging.

The discharge is best carried out through the snout of the crucible 16 by tilting the crucible 16 as shown in broken lines in Fig. 3, to discharge the molten metal 31 into a pot 41.

I wish it to be understood that I do not desire to be limited to the exact details of construction shown and described for obvious modifications will occur to a person skilled in the art.

Having thus described the invention, what I claim as new and desire to be secured by Letters Patent, is as follows:

1. In a method for melting solid metal parts having a large surface, in a melting bath in an electric induction furnace having a heating primary coil divided axially of the furnace into a plurality of at least three portions, the steps comprising, first delivering electric energy only to the lower portion of the coil surrounding a molten metal sump, thereafter delivering the main portion of the electric energy stepwise into succeeding higher portions of the coil in accordance with the rise of the level of the sump due to the delivery of fresh metal into the molten metal sump.

2. A method as claimed in claim 1, together with the step comprising accompanying the delivering of the electric energy to the higher portions by de-energizing of the lower portion of the heating coil.

3. A method as claimed in claim 1, together with the step comprising accompanying the delivery of the electric energy to the higher portions with a decrease of the electric energy of the lower portion until it has been decreased to a small value sufficient to maintain the molten metal heated.

4. A method as claimed in claim 1, together with the step comprising charging the furnace from above with solid metal pieces.

5. A method as claimed in claim 4, said charging being continuous, together with the step of withdrawing liquid metal.

6. A method as claimed in claim 4, said charging being intermittent, together with the step of intermittently withdrawing liquid metal.

References Cited in the file of this patent

UNITED STATES PATENTS

| Number | Name | Date |
|---|---|---|
| 1,330,133 | Northrup | Feb. 10, 1920 |
| 1,338,881 | Stock | May 4, 1920 |
| 1,794,863 | Northrup | Mar. 3, 1931 |
| 1,839,802 | Northrup | Jan. 5, 1932 |
| 1,940,622 | Clamer | Dec. 19, 1933 |
| 1,943,802 | Northrup | Jan. 16, 1934 |
| 2,356,013 | Spooner | Aug. 15, 1944 |
| 2,597,269 | Tama et al. | May 20, 1952 |
| 2,732,292 | Jordan | Jan. 24, 1956 |
| 2,754,347 | Wroughton et al. | July 10, 1956 |
| 2,755,326 | Kennedy | July 27, 1956 |